(No Model.)
L. S. STARRETT & C. P. FAY.
CALIPERS AND DIVIDERS.
No. 539,759. Patented May 21, 1895.
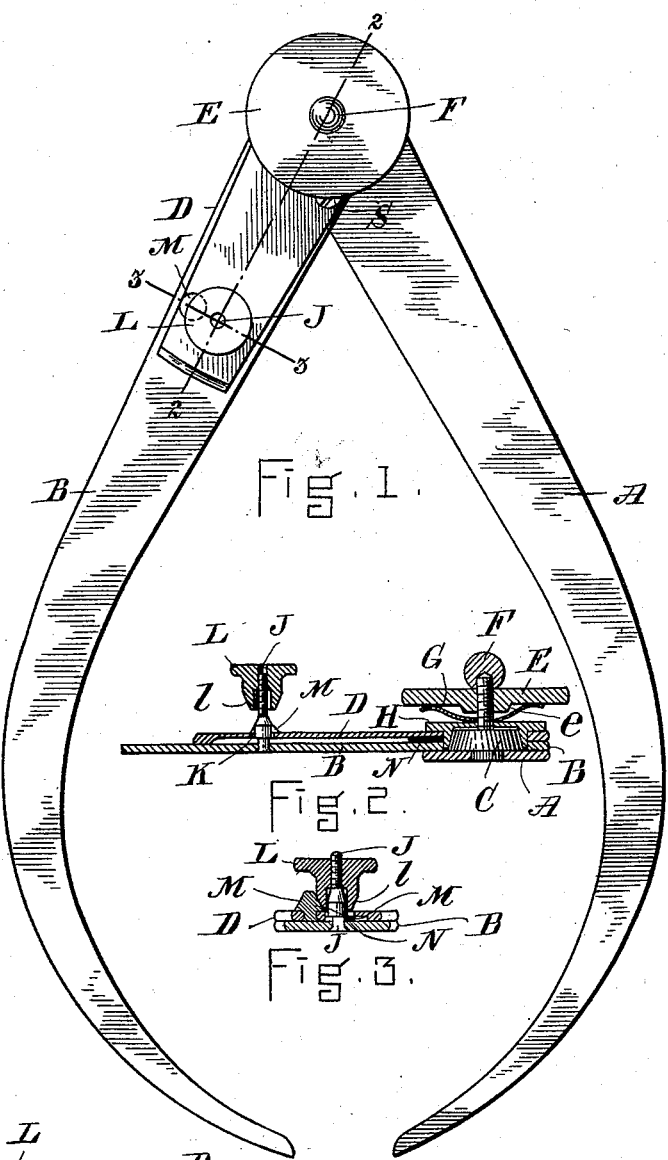
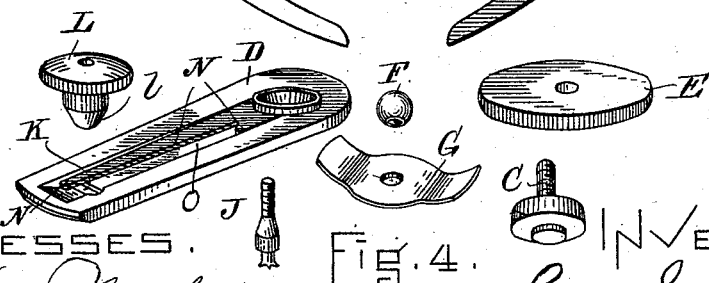
WITNESSES.  INVENTORS.

UNITED STATES PATENT OFFICE.

LAROY S. STARRETT AND CHARLES P. FAY, OF ATHOL, MASSACHUSETTS, ASSIGNORS TO SAID STARRETT.

CALIPERS AND DIVIDERS.

SPECIFICATION forming part of Letters Patent No. 539,759, dated May 21, 1895.

Application filed February 6, 1893. Serial No. 461,153. (No model.)

*To all whom it may concern:*

Be it known that we, LAROY S. STARRETT and CHARLES P. FAY, of Athol, in the county of Worcester and State of Massachusetts, have jointly invented certain new and useful Improvements in Calipers and Dividers, of which the following, taken in connection with the accompanying drawings, is a specification.

This invention is adapted for both outside and inside calipers and for dividers; and it provides both for instant adjustment over wide distances and for delicate adjustment in nice measurements after it has been set and locked in approximately correct position.

Our improvements relate to a tapering, frictional locking device for the jointed or pivoted legs; to a beveled adjusting device for effecting the delicate adjustment, and to a concealed spring serving to press the beveled surfaces of this adjusting device into close contact with each other.

Our improved calipers has the two pivoted legs and a leaf or flat metal plate in surface contact with one of them, but adapted to be locked, frictionally, to the other. The pivoted end of this leaf is thickened and a tapering socket formed through it to receive the enlarged tapering head of the screw-threaded stud which unites the legs and receives the milled nut which tightens and locks them together. The thickening of the leaf-end is preferably effected by introducing through it a flanged thimble having the desired taper internally to fit the tapering head of the stud and soldering or otherwise securing the thimble to the leaf. A spring is interposed between the under face of the milled nut and the leaf or flange to maintain a slight friction on the nut. A terminal knob is fixed on the tip of the threaded stud as a finish and to prevent loss of the nut by unscrewing. The adjusting device is a milled nut having a beveled hub mounted on a threaded stud fixed in one of the legs and projecting through a slot in the leaf or short arm which is fixed to the other leg, such beveled hub bearing against a conical protuberance on said leaf, while a spring concealed within a recess in the under side of the leaf presses the beveled hub into close contact with such protuberance.

In the drawings, Figure 1 is a plan of our improved calipers. Fig. 2 is a longitudinal section on the line 2 2, Fig. 1; and Fig. 3, a transverse section thereof on the line 3 3. Fig. 4 represents several of the parts detached, the leaf or short arm being inverted.

The legs A B of the instrument are flat, tapering, metallic strips, united at the larger end by a pivot or stud C of peculiar construction and function. An auxiliary leaf or flat metal plate D, is also held by said pivot, and by a short screw S, in surface contact with the leg B but adapted to be locked, frictionally to the leg A, leaving the leg B capable of a slight movement in adjusting the instrument to exact measurements while so locked.

The pivot C has a cylindrical end-portion which is inserted in a perforation of and riveted rigidly to the leg A. It has also an enlarged tapering body and a threaded stem, such tapering body fitting a corresponding socket in the thickened end of the auxiliary leaf D, and the threaded stem engaging the enlarged milled disk or nut E, by which said tapering parts are drawn tightly together to lock them frictionally or are loosened to give a free movement. A knob F is fixed upon the tip of the threaded stem as a finish and to prevent the disk E from becoming lost by unscrewing. A spring G is interposed between the disk and the leaf D to maintain a moderate pressure on the disk and joint at all times. We practically thicken the leaf end, to afford an extended tapering surface therein, by a simple device. We insert through an enlarged aperture in the end of the leaf D a flanged thimble H permanently united to the leaf, the broad flange resting upon the outer face and the cylindrical body fitting tightly into the aperture of the leaf, and projecting beyond it far enough to form a pivot or bearing for the adjusting movement of the leg B. This cylindrical body is internally recessed, with tapering walls to receive the tapering body of the pivot C, there being a central perforation through the flange for passage of the threaded stem of said pivot. The disk or nut E has a reduced central hub $e$ which bears on the outer face of the spring G at its central portion, pressing it rigidly against the flange in tightening the joint. This construction will be clear from the sectional view, Fig. 2, and from the representation of the parts detached, in Fig. 4.

It is obvious that when the tapering parts C and H are pressed firmly together, by tightening the nut E, the leg A and leaf D (to which said parts are fixed) will be locked frictionally, and that the movement of the leg B toward and from leg A will, while locked, be only so much as such leg B may yield with relation to the auxiliary leaf D. This slight yielding is, however, sufficient for the fine adjustment required in making exact measurements; and is attained under our invention as will be explained.

The leg B has fixed to it a stud or pin J protruding through a transverse slot K near the outer end of the leaf D Figs. 3 and 4. This stud is threaded at its upper end to receive a milled nut L having below its head or milled edge a beveled hub $l$. The leaf D has, at the end of said slot, a rigid, beveled or tapering protuberance M, against which the beveled hub of the nut L bears when said nut is screwed down, the effect being to press the stud J, on which the nut works, away from such rigid protuberance, and thereby to carry the leg B toward the leg A and away from the leaf D to which such protuberance is fixed, thus varying to a limited extent, the distance of the legs A and B. This movement is resisted by a suitable spring which moves the leg B backward when the nut L is retracted or unscrewed.

We arrange a flat spring N in an elongated recess O formed in the under side of the leaf D, the head or broad end of such spring fitting the walls of said recess, while its elongated body springs edgewise, bearing at or near its free end against the side of the stud J, where it passes through the leaf, and pressing said stud toward the fixed protuberance M. Thus the arm B is spring-pressed in opposition to the sidewise movement caused by the screwing down of the nut L, and a delicate adjustment of the legs is accomplished after the leaf D and leg A are locked. These movements are not obstructed by the short screw S, which holds the leaf D to the leg B, since the perforation through the leaf is not threaded and is larger than the stem of the screw which is threaded at its tip to engage in the leg B, while its broad head bears on the upper face of the leaf.

In cases where a delicate adjustment is not required the leaf may be held fast to the leg B, becoming thus a thickening or reinforcing of such leg. The instrument so made would have capacity for quick adjustment to practically correct positions and firm locking frictionally when so adjusted.

In applying our improvement to dividers the shape of the legs will be somewhat changed, but aside from this the instrument need not be essentially varied from what is herein illustrated and described. For inside calipers it is only necessary to cross the legs at the point, when they can be locked and adjusted in any desired position as already described.

We claim as our joint invention—

1. The legs A B, and the leaf D, lying in contact with one leg but adapted to be frictionally locked to the other in combination with the pivot C uniting them, and with the milled disk E working on the threaded stem of the pivot to lock or to release the legs, for the purpose set forth.

2. The legs A B and the leaf D adjustably secured to the leg B, thickened at its end and provided with an enlarged tapering aperture, in combination with the pivot C uniting said legs and leaf, fixed to the leg A and having an enlarged tapering body fitting the aperture in said leaf, and with the disk or nut E on the threaded stem of the pivot, substantially as set forth.

3. The legs A B, the pivot C having an enlarged tapering body and threaded stem, and the milled disk E working on said stem, in combination with the auxiliary leaf D and the flanged thimble H fixed therein and formed with the cylindrical body as a bearing for the leg B and the tapering socket to fit the pivot body, similarly tapered, substantially as set forth.

4. In calipers and dividers, the legs A B, the pivot C uniting them, the spring G held by said pivot, and the disk-nut E with hub $e$ adapted to rigidly press said spring at its central part, in combination with the auxiliary leaf D adjustably secured to the leg B, adapted to be locked frictionally to the leg A and provided with means for adjusting the relative position of the legs, for the purpose set forth.

5. In calipers and dividers, the jointed legs and auxiliary leaf connected by the same pivot and adapted to be locked frictionally together, and the screw S serving to press said leaf against the leg B but permitting its adjustment, in combination with an adjusting device and a spring adapted to hold the leg against said device, substantially as set forth.

6. In calipers and dividers, the pivoted legs and auxiliary leaf adapted to be set and locked frictionally in position, in combination with a flat spring concealed between said leaf and one of the legs and with an adjusting screw and beveled hub working on an axis perpendicular to the plane of movement of said legs, whereby a fine adjustment of the locked legs is attained, substantially as set forth.

7. In calipers and dividers, the pivoted legs A B and the flat leaf D adapted to be locked frictionally together, in combination with the threaded stud J projecting from the leg B through said leaf, the nut L with beveled hub *l* working on said stud, and with the rigid beveled protuberance M and the retracting spring N connected with said leaf, substantially as and for the purpose set forth.

In testimony whereof we have signed our names to this specification, in the presence of two subscribing witnesses, on this 18th day of January, A. D. 1893.

LAROY S. STARRETT.
CHARLES P. FAY.

Witnesses:
ANDREW J. HAMILTON,
MINERVA K. PITTS.